T. M. DANIELS.
SELF LOCKING NUT.
APPLICATION FILED FEB. 7, 1914.
1,164,478.
Patented Dec. 14, 1915.
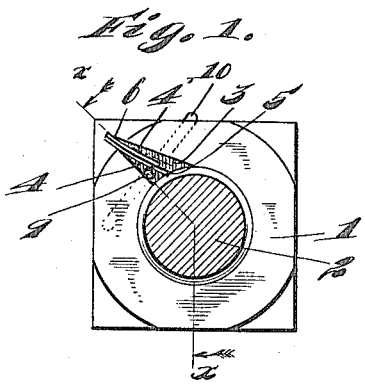
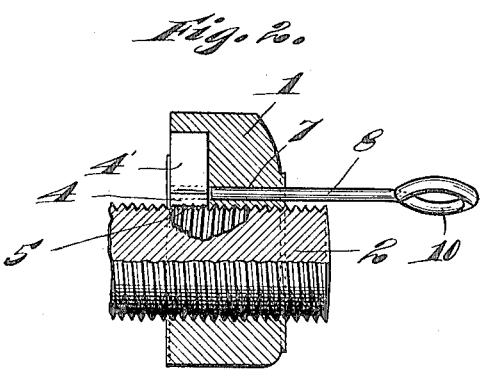
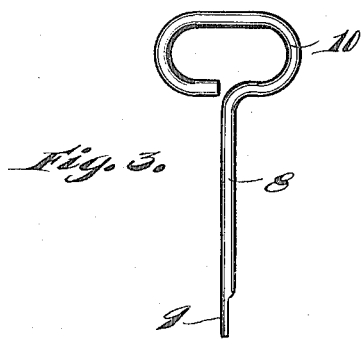
Witnesses:
C. E. Wessels.
B. G. Richards
Inventor:
Thomas Marion Daniels,
By Joshua R. H. Potts
his Attorney.
COLUMBIA PLANOGRAPH CO., WASHINGTON, D. C.

UNITED STATES PATENT OFFICE.

THOMAS MARION DANIELS, OF CHICAGO, ILLINOIS, ASSIGNOR TO DANIELS SAFETY DEVICE COMPANY, OF CHICAGO, ILLINOIS, A CORPORATION OF ILLINOIS.

SELF-LOCKING NUT.

1,164,478. Specification of Letters Patent. Patented Dec. 14, 1915.

Application filed February 7, 1914. Serial No. 817,149.

*To all whom it may concern:*

Be it known that I, THOMAS M. DANIELS, a citizen of the United States, and a resident of the city of Chicago, county of Cook, and State of Illinois, have invented certain new and useful Improvements in Self-Locking Nuts, of which the following is a specification.

My invention relates to improvements in self-locking nuts and has for its object the provision of an improved self-locking nut and an improved means for releasing said nut when desired.

The invention consists in the combinations and arrangements of parts hereinafter described and claimed.

The invention will be best understood by reference to the accompanying drawing forming a part of this specification, and in which, Figure 1 is a bottom plan view of a construction, embodying my invention showing the bolt in section, Fig. 2, a section taken on line x—x of Fig. 1, and Fig. 3, a detail view of a releasing pin employed in the construction.

The preferred form of construction as illustrated in the drawing comprises an ordinary square nut 1 which is threaded upon its bolt 2 in the usual manner. Nut 1 is provided with a recess 3 in its under side adjacent bolt 2 and a leaf locking spring 4 is secured in said recess with its free edge 5 adapted to impinge or contact with the threads on bolt 2 to prevent loosening of nut 1 after it has been tightened. Locking spring 4 is reinforced by a shorter leaf spring 4' which is arranged adjacent thereto as shown in Fig. 1. The outer ends of springs 4 and 4' are secured in an extension 6 of recess 3 which is shaped to snugly receive the same, said springs being secured in said recess portion by upsetting the edges of said recess portion over the edges of said springs as will be readily understood. By this arrangement it will be observed that the edge 5 of spring 4 will ride freely upon the threads of bolt 2 when nut 1 is tightened, but will 'bite" into the thin edges of the threads upon loosening movement of said nut. In order to facilitate removal of the nut when desired, a cylindrical opening 7 is formed longitudinally through nut 1 leading into recess 3 and a releasing pin 8 is arranged to be inserted through opening 7 into recess 3. The inner end of pin 8 is provided with an eccentric projection 9 the same being formed by filing away or otherwise removing one side of the end of the pin and is adapted to engage under spring 4 as shown in Fig. 1 and withdraw spring 4 from contact with the threads of bolt 2 upon rotation of pin 8 as will be readily understood. At its outer end pin 8 is bent to form a handle 10 which facilitates manipulation thereof.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A self-locking nut comprising a nut and a bolt, said nut being provided with a recess therein; a spring locking member in said recess and arranged to impinge upon the threads of said bolt and automatically lock said nut against loosening, there being an opening extending longitudinally through said nut and into said recess; and a pin adapted to be inserted through said opening and provided at its end with an eccentric projection formed by removing a portion thereof and adapted to release said locking member upon rotation of said pin, substantially as described.

2. A self-locking nut comprising a nut and a bolt, said nut being provided with a recess therein; a spring locking member in said recess and arranged to impinge upon the threads of said bolt and automatically lock said nut against loosening, there being a cylindrical opening extending longitudinally through said nut and into said recess; a cylindrical pin adapted to be inserted through said opening and provided at its end with an eccentric projection formed by removing a portion thereof and adapted to release said locking member upon rotation of said pin; and an operating handle on said pin, substantially as described.

In testimony whereof I have signed my name to this specification in the presence of two subscribing witnesses.

THOMAS MARION DANIELS.

Witnesses:
 JOSHUA R. H. POTTS,
 ARTHUR A. OLSON.

Copies of this patent may be obtained for five cents each, by addressing the "Commissioner of Patents, Washington, D. C."